United States Patent [19]

Schneider

[11] Patent Number: 4,735,644
[45] Date of Patent: Apr. 5, 1988

[54] METHOD FOR MANUFACTURING GLASS OPTICAL FIBER PREFORMS

[75] Inventor: Hartmut Schneider, Munich, Fed. Rep. of Germany

[73] Assignee: Siemens Aktiengesellschaft, Berlin and Munich, Fed. Rep. of Germany

[21] Appl. No.: 761,757

[22] Filed: Aug. 2, 1985

[30] Foreign Application Priority Data

Sep. 18, 1984 [DE] Fed. Rep. of Germany ....... 3434213

[51] Int. Cl.$^4$ .................. C03C 25/02; C03B 23/04; C03B 19/09
[52] U.S. Cl. ........................................ 65/3.12; 65/13; 65/18.2
[58] Field of Search .................. 65/3.12, 3.2, 13, 18.2, 65/144; 427/167

[56] References Cited

U.S. PATENT DOCUMENTS

| 4,428,979 | 1/1984 | Nakamura et al. | 427/167 |
| 4,435,199 | 3/1984 | Potkay | 65/3.12 |
| 4,507,135 | 3/1985 | Morse | 65/18.2 |

FOREIGN PATENT DOCUMENTS 2551885  3/1985  France ........................ 65/3.12

Primary Examiner—S. Leon Bashore
Assistant Examiner—Michael K. Boyer
Attorney, Agent, or Firm—Hill, Van Santen, Steadman & Simpson

[57] ABSTRACT

A method for the manufacture of glass, in particular, for glass fibers for optical communications, is provided, wherein glass particles on a substrate rod rotating about its axis, are deposited from a flame. In order to increase the yield of the deposition, two or more substrate rods are arranged at a distance from one another such that, between them an interstice with a diameter which is preferably smaller than the diameter of the free flame remains free and the flame is conducted through the interstice. By this method it is possible for the flame to be surrounded by substrate surfaces from several sides, as a consequence of which an increase in the yield of the deposition rate results.

14 Claims, 2 Drawing Sheets

↑ $H_2, O_2, SiCl_4$

METHOD FOR MANUFACTURING GLASS OPTICAL FIBER PREFORMS

BACKGROUND OF THE INVENTION

1. Field of the Invention

The present invention relates to a method for the manufacture of glass, in particular for glass fibers for optical communications through deposition of glass particles on a substrate from a flame.

2. Description of the Prior Art $SiO_2$ for glass fibers used in optical communications devices can be produced through flame hydrolysis, as is known. Known methods are the OVD-method and the VAD-method in which doped $SiO_2$ is deposited in the form of a securely adhering powder on the cladding surface, or the end face of a rotating substrate rod. In the case of the first-cited method, the flame and the substrate rod are moved relatively to one another in longitudinal direction of the substrate rod, and the dopant concentration is chronologically varied in the fuel gas generating the flame, whereas position and concentration, in the case of the second-cited method, are not changed. Common to both methods is the limited yield of the deposition, for approximately 50% of the employed $SiCl_4$ is lost as $SiO_2$ with the exhaust gas and must be filtered out. The effective mechanism in the case of the deposition is thermophoresis, which leads to the migration of the glass particles disposed in the submicron range transversely to the gas stream from the hot center of the flame to the cold substrate.

SUMMARY OF THE INVENTION

An object of the invention is to increase, in a simple fashion, the yield of the deposition of $SiO_2$ on to the substrates.

This object is achieved by surrounding the flame on several sides by substrate surfaces.

The principle recognized by the invention is that, in the case of the previously publicized arrangements of a substrate rod relative to one or more flames, the deposition does not entirely succeed because the particles on the side of the flame not facing the substrate rod drift away from the substrate. The cause of this is the temperature progression which drops from the flame center to the edge. A more efficient deposition can be achieved if the flame is surrounded by substrate surfaces at several, and preferably at all sides.

In the case of a method of the conventional type, in which deposition is carried out on a substrate rod rotating about its axis, it is advantageous and expedient to proceed by a method such that two or more substrate rods are arranged at a distance from one another such that an interstice with a diameter between them, which lies on the order of magnitude of the diameter of the free flame, remains free and unobstructed, and that the flame is guided through the interstice. It is advantageous if the interstice has a diameter which is somewhat smaller than the diameter of the free flame.

For carrying out an OVD method, an expedient method provides that two substrate rods are arranged parallel and adjacent to one another, perpendicular to the flame, and can be oppositely rotated in the flow direction of the flame gases while moving the rods longitudinally relative to the flame.

In order to carry out a VAD method a preferable method is to guide the flame through the interstice between adjacent ends of several substrate rods distributed about the flame and diverging from one another in flow direction of the flame gases. Preferably the several diverging substrate rods are rotated in the same direction.

It is also preferable if the two or more substrate rods in either arrangement are moved away from one another with increasing deposition such that the interstice between them is preserved.

BRIEF DESCRIPTION OF THE DRAWINGS

Two sample embodiments of the invention shall be explained in greater detail on the basis of the Figures and the following specification. Of the Figures.

DESCRIPTION OF THE PREFERRED EMBODIMENTS

Figure 1:
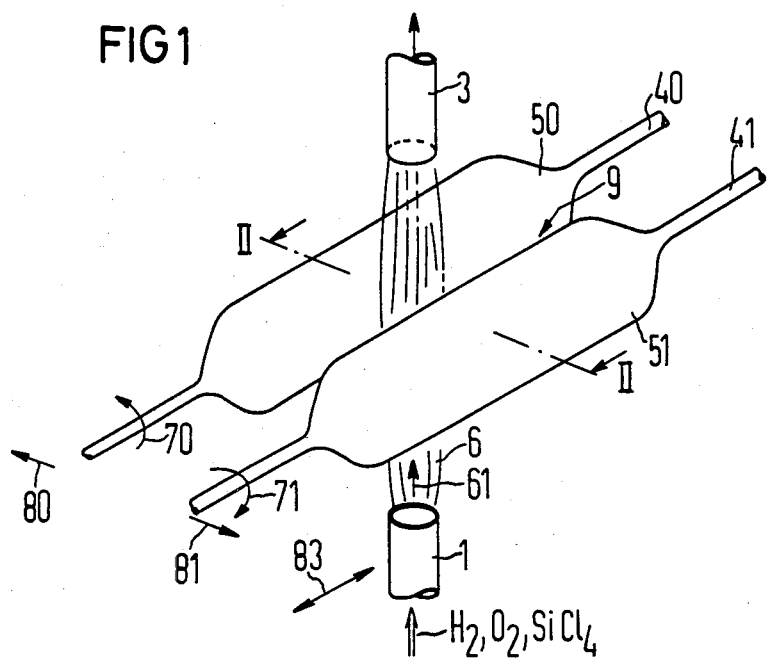
FIG. 1 shows in a schematic perspective representation, an arrangement for carrying out a sample embodiment of the invention in which two substrate rods are arranged parallel and adjacent one another.
Figure 2:
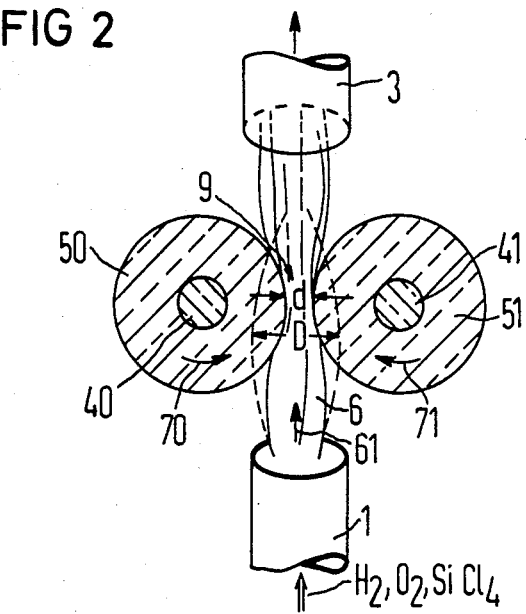
FIG. 2 shows a section through the arrangement according to FIG. 1 perpendicular to the longitudinal direction of the substrate rods and generally along the sectional line I—I.

In the arrangement according to FIGS. 1 and 2, a flame 6 given off by a hydrolysis burner 1, is vertically guided between two horizontal substrate rods 40, 41, which are parallel and spaced apart by a distance d to form a gap 9. The substrate rods 40, 41 are preferably rotated in opposite directions in the direction of arrows 70, 71, and also preferably in flow direction 61 of the flame gases. The fuel gas mixture, arranged beneath the two substrate rods 40, 41 supplied to the burner 1, consists, for example, of a mixture of $H_2$, $O_2$, and $SiCl_4$.

The flame 6 is drawn upwardly due in part to the suction action of a suction removal means 3, arranged above the substrate rods 40, 41 and positioned opposite the burner 1. The flame 6, which has a normal diameter D, passes through the gap 9 between the substrate rods 40, 41 which gap is narrow relative to the flame diameter D, whereby the flame becomes flat-rolled to a certain extent. A two-sided effective deposition of the glass particles from the flame gases is thereby made possible, whereby also advantageously, the inner regions of the flame 6 are engaged by the rods.

In order that two uniformly cylindrical members 50, 51 grow through the deposition, the burner 1, expediently together with the suction removal 3, and the substrate rods 40, 41 are moved back and forth relative to one another in a longitudinal direction, indicated by arrows 83, of the rods, and moreover, the substrate rods 40, 41 in accordance with the thickness increase of the growing cylindrical members 50, 51 on the rods are moved apart perpendicularly to the longitudinal direction 83 of the rods, i.e. in the direction of arrows 80 and 81, such that the gap 9 between the cylindrical members 50, 51 is preserved. By a selection of the width d of the gap 9 between the substrate rods 40, 41 or the growing cylindrical members 50, 51 the temperature on the substrate surface, and hence the density of the deposited material, can be selected since the temperature of the flame varies through its diameter. From the sectional view of FIG. 2 it can be clearly recognized how the flame 6, passing through the gap 9 between the members 50 and 51, is flat-rolled.

Figure 3:
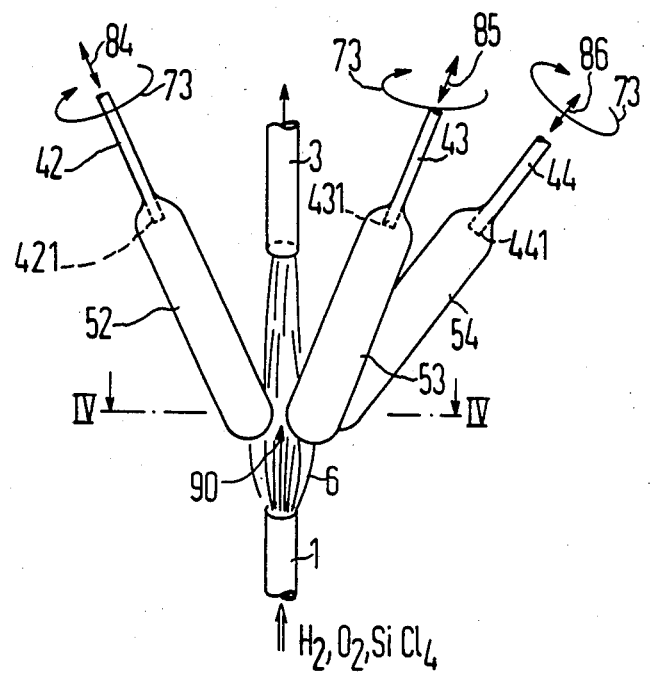
FIG. 3 shows in schematic perspective representation, an arrangement for carrying out the other sample embodiment, in which several substrate rods are arranged around the flame.
Figure 4:
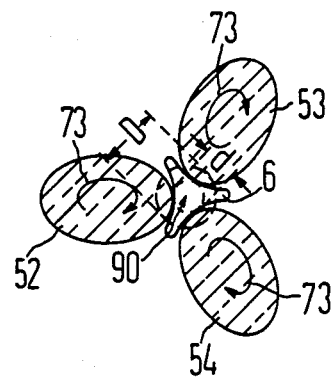
FIG. 4 shows a horizontal section through the arrangement according to FIG. 3 generally along the sectional line II—II.

With the arrangement according to FIGS. 3 and 4, from the hydrolysis burner 1, it is possible to simultaneously deposit on end faces 421, 431, 441 of several, for example, three, substrate rods 42, 43, and 44 which are arranged symmetrically to the burner 1, or the flame 6 in the direction of the edges of a triangular pyramid placed on its tip. Between the end faces 421, 431 and 441, originally an interstice 90 with a diameter d' remains free and unobstructed, through which the flame 6 is guided. The flame 6 has a diameter D in the free state which is advantageously larger than the diameter d' of the interstice 90. The substrate rods 42, 43, 44, are rotated in the same direction, in the direction of arrows 73, and, according to the growth of cylindrical members 52, 53, 54, growing in their longitudinal directions 84, 85, and 86 on the rods 42, 43 and 44 respectively, are withdrawn in the longitudinal directions 84, 85, and 86 from the burner 1, or the flame 6, such that, between the end faces 521, 531, and 541 of these members, approximately the original interstice 90 remains free. Here, also, the cross-section of the flame is deformed, for example, corresponding to the sectional image according to FIG. 4, which is favorable for the deposition from the interior flame region.

Both in the arrangement according to FIGS. 1 and 2 as well as in the arrangement according to FIGS. 3 and 4, the direct opposite positioning of burner 1 and suction removal 3 has a favorable effect for the elimination or removal of the reaction product; window and housing sciling can thus be prevented.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. A method for the manufacture of glass preforms for drawing fibers for optical communications, through deposition of glass particles on a substrate from a flame comprising the steps of surrounding the flame with substrate surfaces on several sides by arranging two or more substrate surfaces at a distance from one another such that, between them, an interstice with a diameter which lies on the order of magnitude of the diameter of the free flame remains free and conducting the flame through the interstice.

2. A method according to claim 1, wherein the interstice has a diameter which is smaller than the diameter of the free flame.

3. A method according to claim 1, wherein the substrate surfaces are substrate rods and two substrate rods are arranged parallel adjacent one another.

4. A method according to claim 3, wherein the two parallel substrate rods are rotated in opposite directions in flow direction of the flame gases.

5. A method according to claim 1, wherein the substrate surfaces and substrate rods and the flame is conducted through the interstice between adjacent ends of several substrate rods arranged about the flame and diverging from one another in the flow direction of the flame gases.

6. A method according to claim 5, wherein the several diverging substrate rods are rotated in the same direction.

7. A method for the manufacture of glass preforms for drawing fibers for optical communications, through deposition of glass particles on a substrate rod rotating about its axis, comprising the steps of surrounding the flame with substrate surfaces on said substrate rods on several sides by arranging two or more substrate rods at a distance from one another such that, between them, an interstice with a diameter which lies on the order of magnitude of the diameter of the free flame remains free and conducting the flame through said interstice, wherein the two or more substrate rods are moved away from one naother with increasing deposition such that the interstice between them is preserved.

8. A method according to claim 1, wherein the flame given off by a burner and conducted through the interstice between the substrate surfaces is drawn off by means of a suction removal means positioned opposite the burner.

9. A method for the manufacture of preforms for drawing glass fibers for optical communications, through deposition of glass particles on a substrate from a flame comprising the steps:
   positioning a plurality of substrate rods at a distance from one another so as to form an interstice between said rods;
   guiding the flame through said interstice;
   positioning said rods around the flame such that the diameter of said interstice is smaller than the diameter of said flame;
   rotating said rods so as to obtain a uniform deposition of glass particles on said rods; and
   moving said rods apart as deposition increases to maintain the desired sized interstice between said rods.

10. A method according to claim 9, wherein two substrate rods are arranged parallel adjacent one another.

11. A method according to claim 10, wherein the two parallel substrate rods are rotated in opposite directions in flow direction of the flame gases.

12. A method according to claim 9, wherein the flame is conducted through the interstice between adjacent ends of several substrate rods arranged about the flame and diverging from one another in the flow direction of the flame gases.

13. A method according to claim 12, wherein the several diverging substrate rods are rotated in the same direction.

14. A method according to claim 9, wherein the flame given off by a burner and conducted through the interstice between the substrate rods is drawn off by means of a suction removal means positioned opposite the burner.

* * * * *